US007788004B2

(12) United States Patent
Maesono et al.

(10) Patent No.: US 7,788,004 B2
(45) Date of Patent: Aug. 31, 2010

(54) OPERATING CONDITION NOTIFICATION SYSTEM

(75) Inventors: Noboru Maesono, Tokyo (JP); Toshifumi Koshizawa, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 604 days.

(21) Appl. No.: 11/815,819

(22) PCT Filed: Nov. 15, 2005

(86) PCT No.: PCT/JP2005/020914
§ 371 (c)(1),
(2), (4) Date: Aug. 8, 2007

(87) PCT Pub. No.: WO2006/087851
PCT Pub. Date: Aug. 24, 2006

(65) Prior Publication Data
US 2009/0021395 A1    Jan. 22, 2009

(30) Foreign Application Priority Data
Feb. 18, 2005    (JP) .............................. 2005-041856

(51) Int. Cl.
*G08G 1/00* (2006.01)
(52) U.S. Cl. .............................. 701/29; 701/31; 701/33; 701/35; 340/438
(58) Field of Classification Search ............. 701/29–36, 701/39, 43–45; 340/438, 439
See application file for complete search history.

(56) References Cited
U.S. PATENT DOCUMENTS
7,148,866 B2 * 12/2006 Jun .............................. 345/87
7,236,869 B2 * 6/2007 Buckley et al. ............... 701/51
7,522,979 B2 * 4/2009 Pillar ............................ 701/33

FOREIGN PATENT DOCUMENTS

| JP | 9-50548 A | 2/1997 |
|---|---|---|
| JP | 11-213291 A | 8/1999 |
| JP | 2002-367087 A | 12/2002 |
| JP | 2003-44976 A | 2/2003 |
| JP | 2003-109189 A | 4/2003 |
| JP | 2004-38839 A | 2/2004 |
| JP | 2004-234370 A | 8/2004 |
| JP | 2004-240828 A | 8/2004 |
| JP | 2005-276209 A | 10/2005 |

* cited by examiner

*Primary Examiner*—Richard M. Camby
(74) *Attorney, Agent, or Firm*—Sughrue Mion, PLLC

(57) ABSTRACT

In an in-vehicle terminal (2), an operation data acquisition unit acquires operation data of a vehicle. Notification condition information specifying one of pieces of the operation data to be transmitted to the outside is stored in a storage unit. A notification determination unit reads out the latest notification condition information from the storage unit, and determines whether the operation data acquired by the operation data acquisition unit satisfies notification conditions specified by the read out notification condition information. An in-vehicle terminal transmitter-receiver transmits operation data determined to satisfy the notification conditions by the notification determination unit to an operation management terminal (3). At the time of updating the notification conditions, the operation management terminal (3) generates notification condition information according to settings from a user, and this information is transmitted to the in-vehicle terminal (2) via a center unit (4). With the in-vehicle terminal (2), a notification condition updating unit stores the notification condition information generated by the operation management terminal (3) in the storage unit.

3 Claims, 5 Drawing Sheets

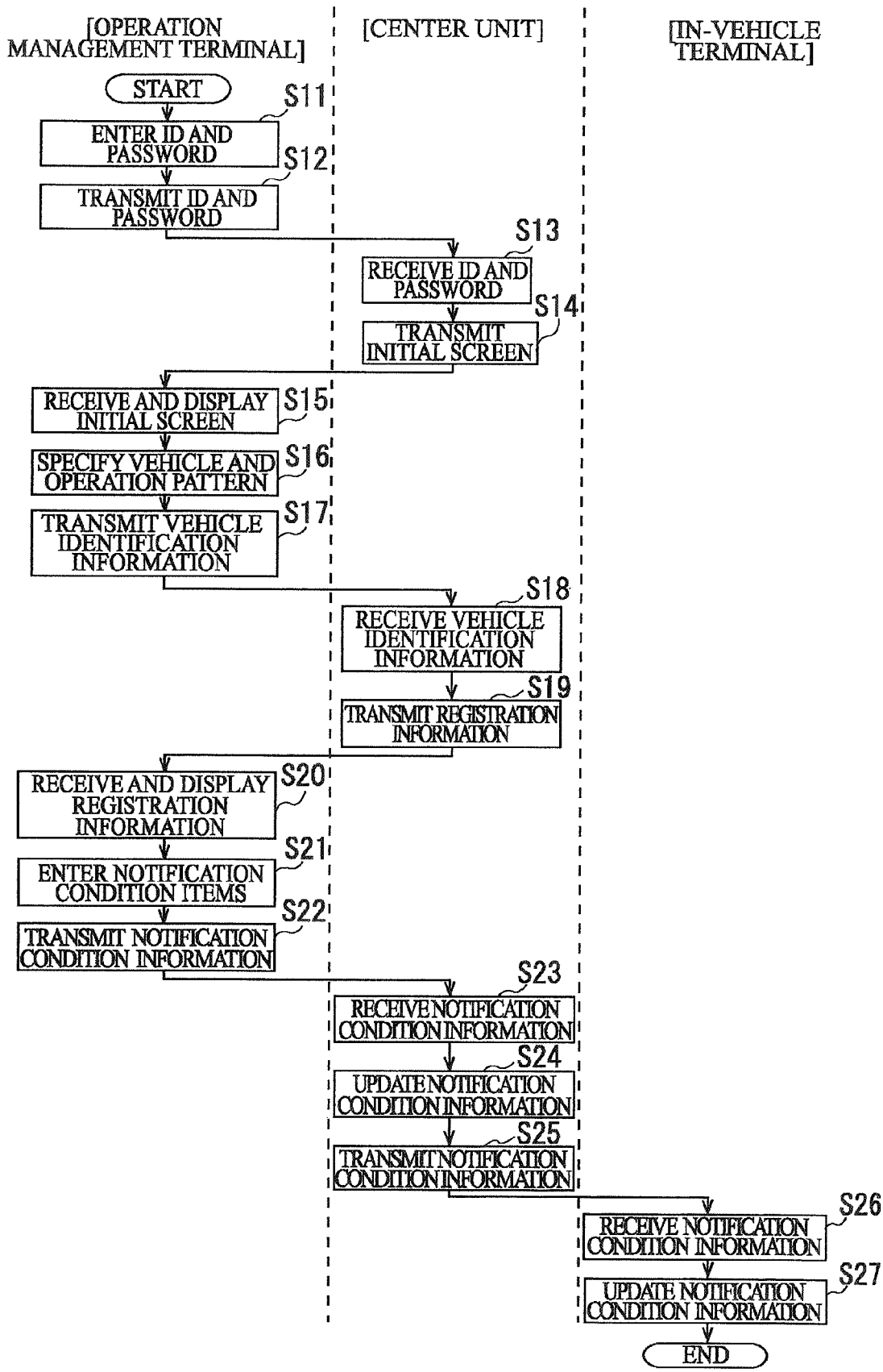

FIG. 8

```
[INDIVIDUAL INFORMATION]
VEHICLE NAME:            NO. ○○
VEHICLE IDENTIFICATION NUMBER:      cx28 ....
OPERATION PATTERN CODE:      1
OPERATION PATTERN:    LM 1 ~ LM 3
LICENSE NUMBER:          TOKYO XX ....
FINAL UPDATE TIME AND DATE: YYYY/MM/DD  HHMM

[ARRIVAL AT/DEPARTURE FROM REGISTERED POINT]
ARRIVAL:         ☑
DEPARTURE:       ☐
      LM 1:      ☐
      LM 2:      ☑
      LM 3:      ☐
TIME DELAY:      [ 10 ] MINUTES

[OPERATING STATE]
KEY ON:                  ☑
BEGIN RECESS:            ☑       END RECESS:         ☑
BEGIN WAIT:              ☐       END WAIT:           ☐
BEGIN LOAD/UNLOAD:       ☐       END LOAD/UNLOAD:    ☐
BEGIN PREPARATION:       ☐       END PREPARATION:    ☐

[LOADING TEMPERATURE]
      SENSOR 1:    ☑     [ 3 ]°C OR GREATER    [  ]°C OR LESS
      SENSOR 2:    ☐     [   ]°C OR GREATER    [  ]°C OR LESS
      SENSOR 3:    ☐     [   ]°C OR GREATER    [  ]°C OR LESS

[VEHICLE LOCATION]
      TRANSMIT VEHICLE LOCATION:    ☐
      TRANSMISSION INTERVAL:    EVERY [    ] MINUTES

[WITH/WITHOUT MAIL TRANSMISSION]
      TRANSMIT MAIL:   ☐
      TRANSMISSION DESTINATION ADDRESS 1: [           ]
      TRANSMISSION DESTINATION ADDRESS 2: [           ]
      TRANSMISSION DESTINATION ADDRESS 3: [           ]
```

OPERATING CONDITION NOTIFICATION SYSTEM

TECHNICAL FIELD

The present invention relates to an operating condition notification system in which an in-vehicle terminal equipped in a vehicle is connected to a user terminal provided on the user side via a predetermined network.

BACKGROUND ART

A system in which an in-vehicle terminal for acquiring operation data of a vehicle is provided in the vehicle, and operation data transmitted from the in-vehicle terminal is received by a user terminal on the operation controller side, is known as a method for an operation manager of a delivery company to monitor operating conditions of the vehicle delivering packages.

Furthermore, a system in which notification conditions for operation data are preset to the in-vehicle terminal, and operation data satisfying these notification conditions is then transmitted to the user terminal is well-known.

[Patent Document 1] Japanese Unexamined Patent Application Publication No. 2003-044976

[Patent Document 2] Japanese Unexamined Patent Application Publication No. 2004-240828

DISCLOSURE OF INVENTION

Problem to be Solved by the Invention

However, the above-mentioned conventional system requires direct setting of the in-vehicle terminal in the vehicle when changing notification conditions. Furthermore, vehicles used for delivery are normally away from the delivery company for a long time, so that times for changing notification conditions for in-vehicle terminals in the respective vehicles are extremely limited. Therefore, the changing operation for the notification conditions is complicated for the delivery company managing multiple vehicles.

The present invention is created with consideration for the above-described problems, and aims to provide an operating condition notification system allowing a user outside of the vehicle to easily change notification conditions for operation data set to the in-vehicle terminal.

Means of Solving the Problem

In order to solve the above-given problems, an operating condition notification system according to the present invention includes an in-vehicle terminal equipped in a vehicle and a user terminal provided on the user side connected to each other via a predetermined network.

The in-vehicle terminal has an in-vehicle terminal transmitter-receiver, an operation data acquisition unit, a notification condition storage unit, a notification determination unit, and a notification condition updating unit.

The user terminal has a user terminal transmitter-receiver, a user terminal annunciation unit, a user terminal input unit, and an information generation unit.

The in-vehicle transmitter-receiver of the in-vehicle terminal transmits and receives information to and from the outside via a network. The operation data acquisition unit acquires operation data regarding operating conditions of the vehicle. The notification condition storage unit is stored with notification condition information specifying one of pieces of operation data to be transmitted to the outside. The notification determination unit reads out the notification condition information from the notification condition storage unit, and determines whether the operation data acquired by the operation data acquisition unit satisfies the notification conditions specified by the read out notification condition information. The in-vehicle transmitter-receiver transmits data determined to satisfy the notification conditions by the notification determination unit to the user terminal.

The user terminal transmitter-receiver of the user terminal transmits and receives information to and from the outside via a network. The user terminal annunciation unit annunciates to the user, operation data received by the user terminal transmitter-receiver from the in-vehicle terminal transmitter-receiver.

The user terminal input unit of the user terminal receives notification condition settings from the user. The information generation unit generates notification condition information according to the notification condition settings received by the user terminal input unit. The user terminal transmitter-receiver transmits the notification condition information generated by the information generation unit to the in-vehicle terminal.

The notification condition updating unit of the in-vehicle terminal stores the notification condition information, which is transmitted from the user terminal transmitter-receiver and received by the in-vehicle transmitter-receiver, in the notification condition storage unit. The notification condition information to be read out from the notification condition storage unit for the notification determination unit to make the above-described determination is updated notification condition information stored last in the notification condition storage unit.

With the above-given configuration, when the operation data acquisition unit of the in-vehicle terminal of a vehicle with which a delivery person delivers packages acquires operation data, the notification determination unit determines whether or not this acquired data satisfies the notification conditions specified by the notification condition information read out from the notification condition storage unit. The operation data determined by the notification determination unit as satisfying the notification conditions is transmitted to the user terminal from the in-vehicle transmitter-receiver.

In the user terminal, the user terminal transmitter-receiver receives the operation data transmitted from the in-vehicle terminal, and this operation data is annunciated to the user from the user terminal annunciation unit.

Accordingly, provision of the user terminal to the operation manager side of a delivery company allows the operation manager to reliably monitor operating conditions of the vehicle delivering a package.

Furthermore, when changing the notification conditions set to the in-vehicle terminal, a user (e.g., manager of the delivery company) of the user terminal manipulates the user terminal input unit of the user terminal to set the notification conditions. The information generation unit generates notification condition information according to the input and set notification conditions, and the notification condition information is transmitted to the in-vehicle terminal from the user terminal transmitter-receiver.

When the in-vehicle terminal transmitter-receiver of the in-vehicle terminal receives the notification condition information transmitted from the user terminal transmitter-receiver, the notification condition updating unit then stores the received notification condition information in the notification condition storage unit. Namely, notification conditions set to the in-vehicle terminal are updated by inputting settings to the user terminal. Afterwards, the notification determination unit reads out the updated notification condition information stored last in the notification condition storage unit, and determines whether or not the operation data acquired by the operation data acquisition unit satisfies the notification conditions specified by the updated notification condition information. Therefore, after the notification conditions are updated by inputting settings to the user terminal, the operation data is transmitted from the in-vehicle terminal to the user terminal in conformity with the updated notification conditions.

Accordingly, the notification conditions set to the in-vehicle terminal of the vehicle may be updated by manipulating the user terminal capable of being set at any location. Namely, the user of the user terminal may change the notification conditions in real time without being limited in time or location of the vehicle having the in-vehicle terminal, for example, even when the vehicle is in a remote location or while it is moving, as long as the in-vehicle terminal is in a state allowing reception of information from the user terminal.

Furthermore, while the in-vehicle terminal can acquire location information of the vehicle as operation data, it is not always necessary for the operation manager to know successive locations of the vehicle in normal delivery work. However, the operation manager must immediately know the location of the vehicle in special circumstances such as when the vehicle is not carrying out a scheduled operation or in the case of a robbery. In this regard, with the above-given configuration, even when successive transmission of location information is not included in normal notification conditions, the operation manager may immediately know the location information of the vehicle by changing settings of the notification conditions through the user terminal, and may instantly accommodate special circumstances such as when the vehicle is not carrying out a scheduled operation or in the case of a robbery.

Furthermore, as described above, since the normal notification conditions are limited to the minimum operation data and changing the notification condition settings is possible through the user terminal if necessary, the amount of operation data to be transmitted from the in-vehicle terminal may be kept to a minimum, and on the whole, may effectively apply limited network resources.

The above-mentioned operating condition notification system may be connected to the user terminal and the in-vehicle terminal via a network, and may include a relay management unit, which relays information between the user terminal and the in-vehicle terminal.

The relay management unit has a relay transmitter-receiver and relay management memory. The relay transmitter-receiver transmits and receives information between the user terminal and the in-vehicle terminal via a network. The relay management memory is prestored with notification condition item information corresponding to notification condition items that can be set as notification conditions.

The user terminal input unit receives an instruction to begin to set the notification conditions from the user. The information generation unit generates setting begin information when the user terminal input unit receives such an instruction. The user terminal transmitter-receiver transmits the setting begin information generated by the information generation unit to the relay management unit.

The relay transmitter-receiver transmits the notification condition item information stored in the relay management memory to the user terminal upon reception of the setting begin information transmitted from the user terminal transmitter-receiver.

The user terminal annunciation unit annunciates to the user, notification condition items corresponding to the notification condition item information received from the relay transmitter-receiver by the user terminal transmitter-receiver. The user terminal input unit receives notification condition items keyed in by the user. The information generation unit generates notification condition information according to the settings for the notification condition items received by the user terminal input unit. The user terminal transmitter-receiver transmits the notification condition information generated by the information generation unit to the relay management unit.

The relay transmitter-receiver receives the notification condition information transmitted from the user terminal transmitter-receiver and then transmits the notification condition information to the in-vehicle terminal.

With the above-given configuration, when changing the notification conditions, the user only needs to enter settings in conformity with notification condition items provided from the relay management unit, and thus may easily change the notification conditions.

Furthermore, the relay management unit may be connected to in-vehicle terminals in respective vehicles via the network. In this case, it may be configured such that the relay management memory prestores notification condition item information for every vehicle, the user terminal input unit receives from the user an instruction input to begin setting and an input instruction to specify a vehicle, the information generation unit generates setting begin information and vehicle identification information when the user terminal input unit receives an instruction and information to begin setting and specify a vehicle, the user terminal transmitter-receiver transmits the setting begin information and the vehicle identification information generated by the information generation unit to the relay management unit, and the relay transmitter-receiver may transmit to the user terminal, notification condition item information corresponding to the received vehicle identification information of the notification condition item information stored in the relay management memory upon reception of the setting begin information and the vehicle identification information transmitted from the user terminal transmitter-receiver.

With the above-given configuration, the user may change different notification conditions for every vehicle by simple operations.

Note that with the above-given configuration, making the vehicle identification information act as setting begin information allows the user to omit the instruction input to begin setting to the user terminal input unit.

Furthermore, multiple pieces of transmission destination specifying information including at least transmission destination specifying information, which specifies a user terminal, and transmission destination specifying information, which specifies a terminal other than the user terminal capable of receiving information via the network, may be stored in the relay management memory, and the relay transmitter-receiver may transmit operation data transmitted from the in-vehicle terminal transmitter-receiver to multiple terminals specified by the transmission destination specifying information stored in the relay management memory upon reception of the operation data.

With the above-given configuration, the user may acquire operation data using another terminal aside from the user terminal in the same manner as with using the user terminal.

Note that the terminal aside from the user terminal may include the in-vehicle terminal.

EFFECTS OF INVENTION

With the operating condition notification system according to the present invention, notification conditions for operation data set to the in-vehicle terminal may be easily changed by a user outside of the vehicle.

BRIEF DESCRIPTION OF DRAWINGS

FIG. 7 is a flowchart showing update processing of notification conditions; and

FIG. 8 is a diagram schematically showing an exemplary display screen used for the update processing of notification conditions.

DESCRIPTION OF REFERENCE NUMERALS

Figure 1:
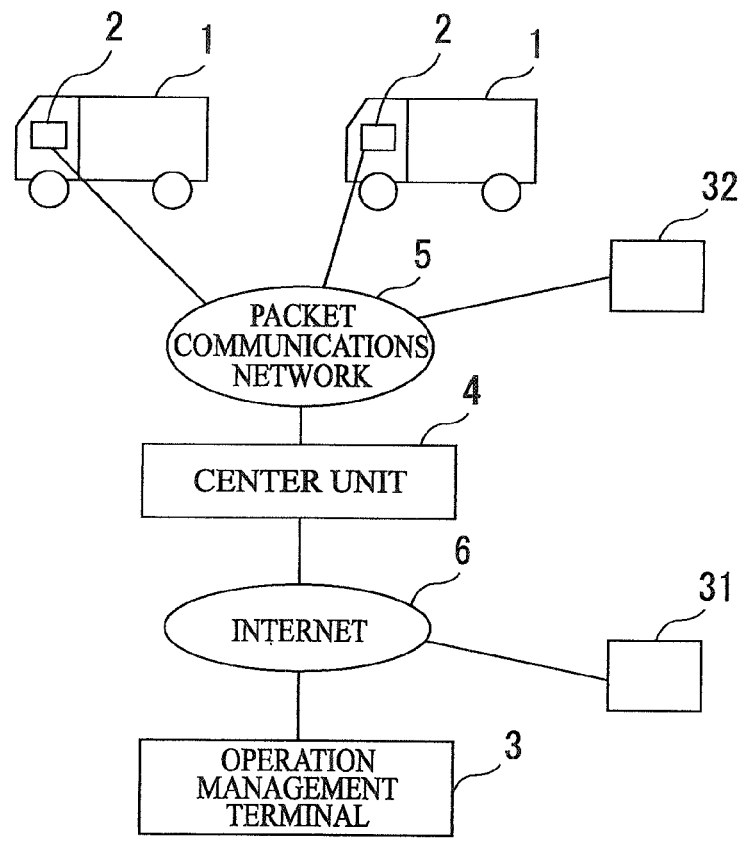
FIG. 1 is a block diagram schematically showing an overall operating condition notification system according to an embodiment of the present invention.

1: vehicle
2: in-vehicle terminal
3: operation management terminal (user terminal)
4: center unit (relay management unit)
5: packet communications network
6: the Internet (network)
11: memory (notification condition storage unit)
12: transmitter-receiver (in-vehicle terminal transmitter-receiver)
14: operation data acquisition unit
15: notification determination unit
16: notification condition updating unit
24: transmitter-receiver (user terminal transmitter-receiver)
25: input unit (user terminal input unit)
26: display unit (user terminal annunciation unit)
27: data generation unit
29: transmitter-receiver (relay transmitter-receiver)
30: memory (relay management memory)

BEST MODE FOR CARRYING OUT THE INVENTION

An embodiment of the present invention is described forthwith based on the appended drawings.

Figure 2:
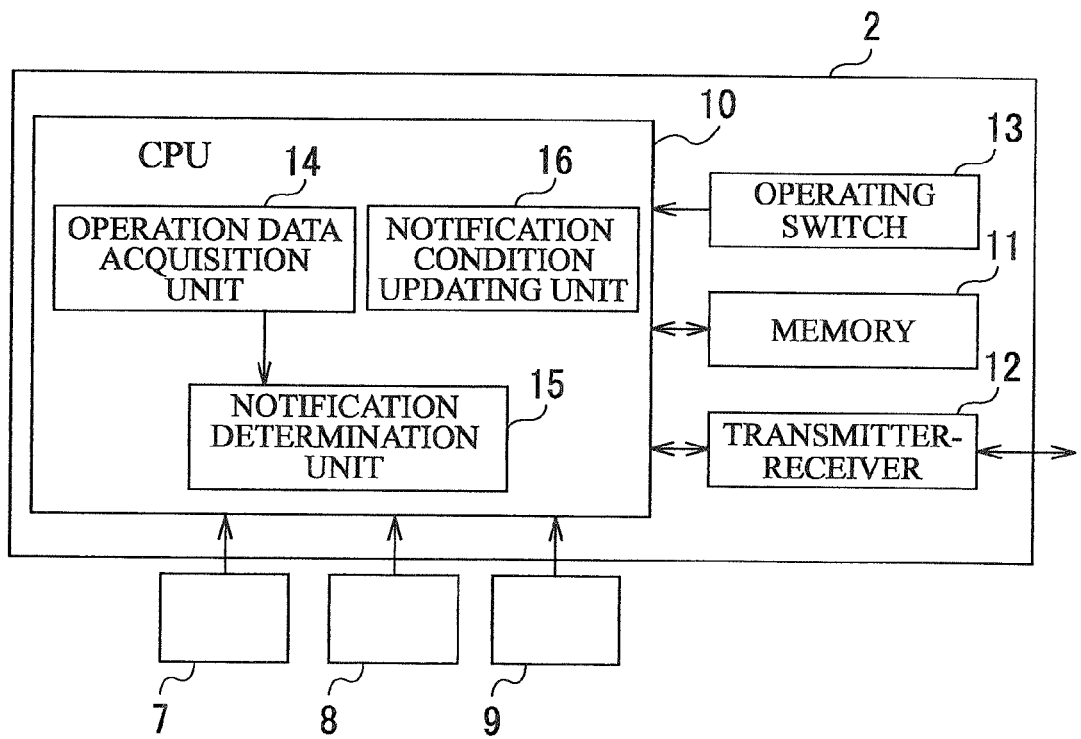
FIG. 2 is a block diagram schematically showing an in-vehicle terminal.
Figure 3:
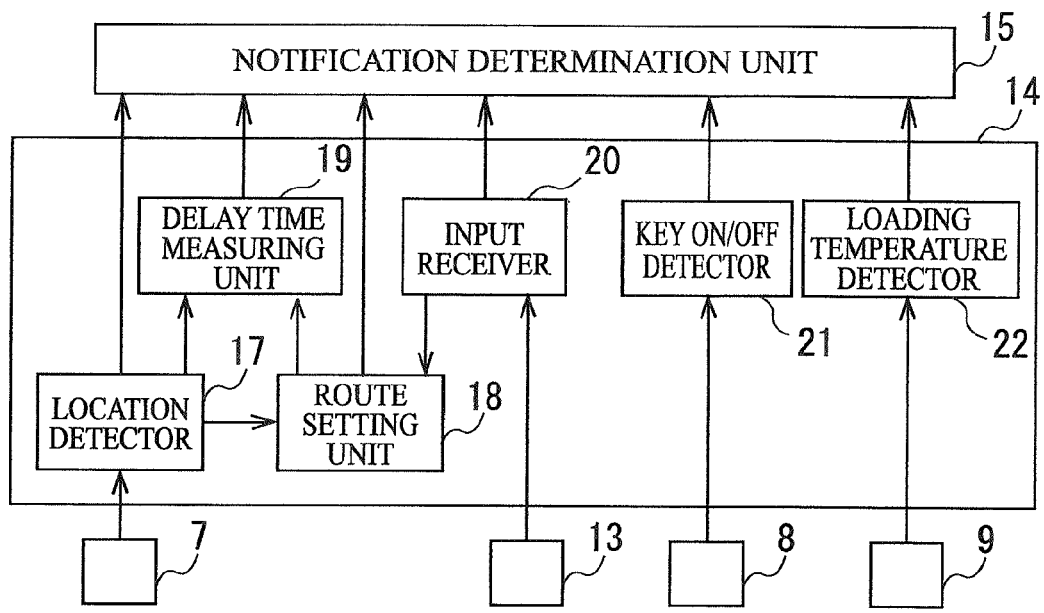
FIG. 3 is a block diagram schematically showing an operation data acquisition unit.
Figure 4:
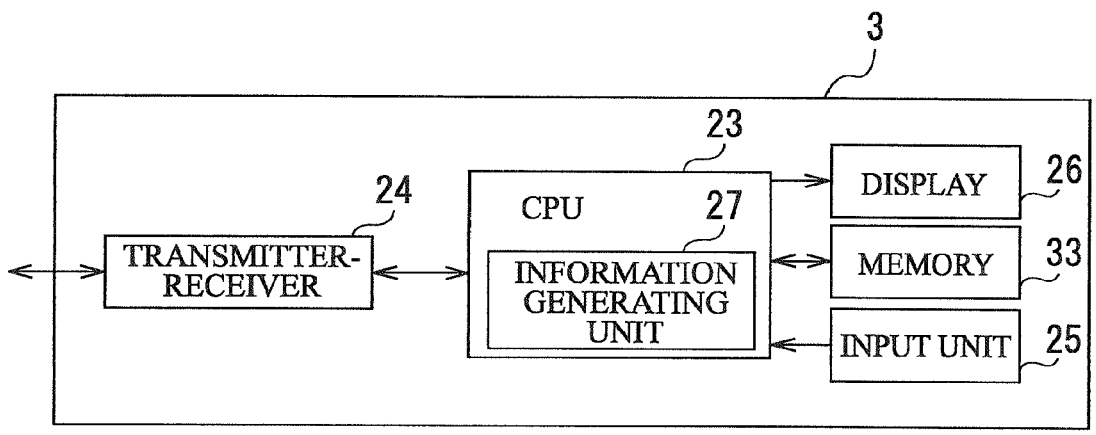
FIG. 4 is a block diagram schematically showing an operation management terminal of FIG. 1.
Figure 5:
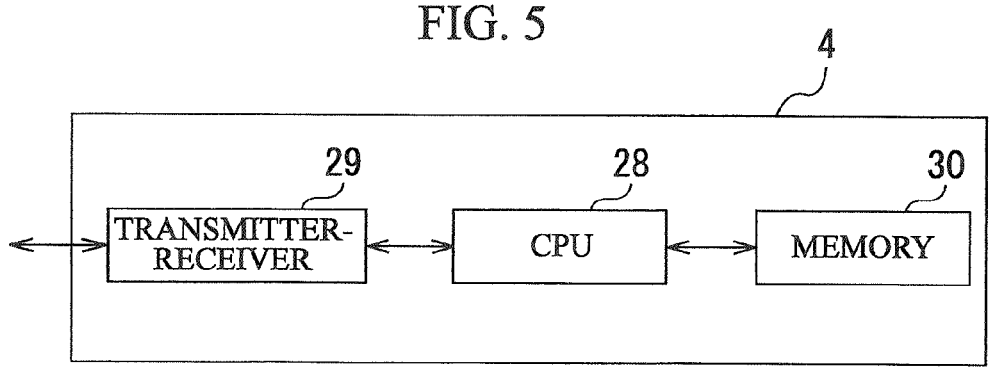
FIG. 5 is a block diagram schematically showing a center unit of FIG. 1.
Figure 6:
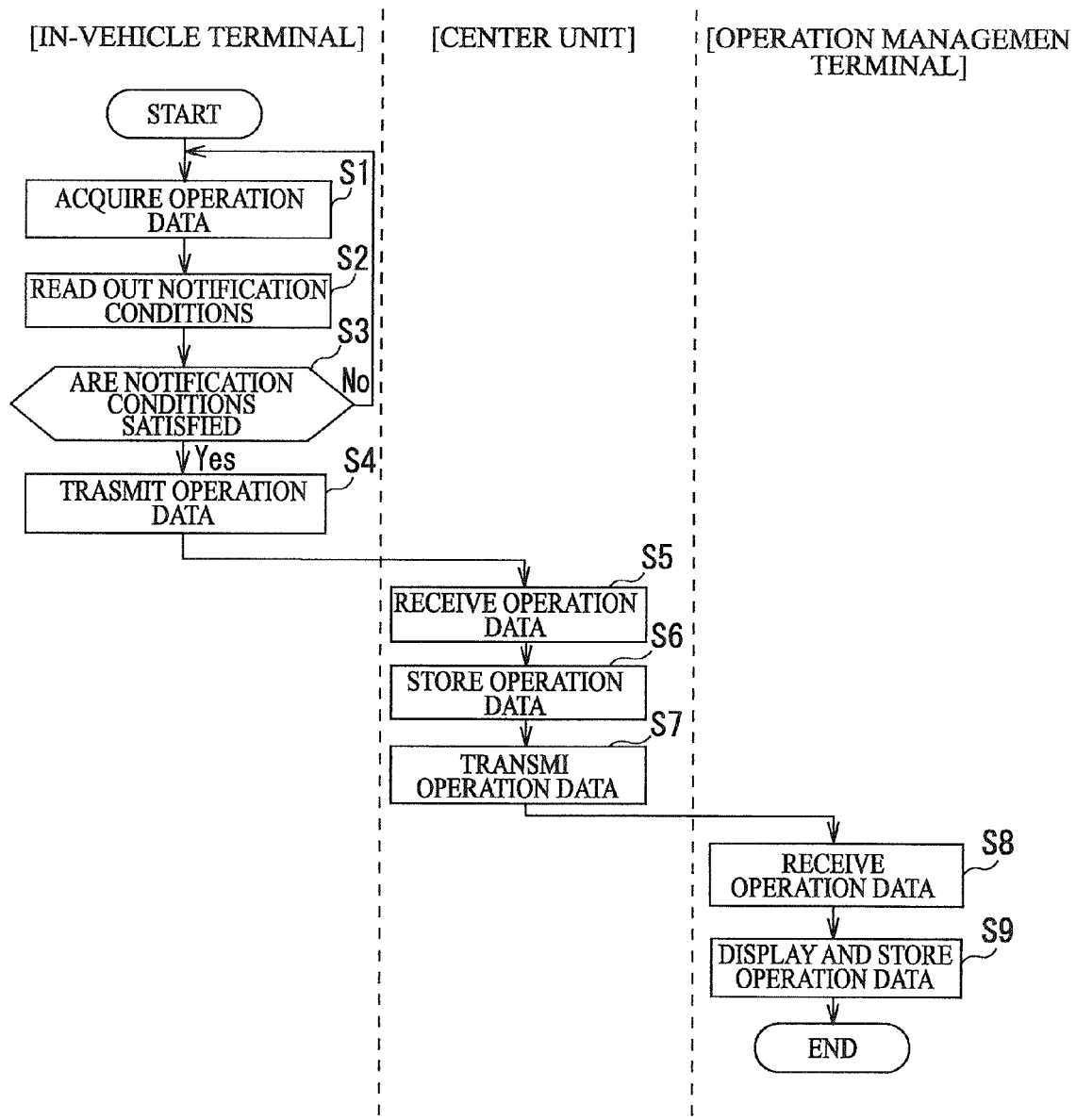
FIG. 6 is a flowchart showing notification processing of operation data.

FIG. 1 is a block diagram schematically showing an overall operating condition notification system according to an embodiment of the present invention. FIG. 2 is a block diagram schematically showing an in-vehicle terminal. FIG. 3 is a block diagram schematically showing an operation data acquisition unit. FIG. 4 is a block diagram schematically showing an operation management terminal of FIG. 1. FIG. 5 is a block diagram schematically showing a center unit of FIG. 1. FIG. 6 is a flowchart showing notification processing of operation data. FIG. 7 is a flowchart showing update processing of notification conditions.

An operating condition notification system according to the present invention includes in-vehicle terminals 2, which are provided in respective vehicles 1 for carrying out delivery services, an operation management terminal 3, which is used as a user terminal manipulated by an operation manager at a delivery company managing the vehicles 1, and a center unit 4, which is used as a relay management unit provided at a system operating company providing the operating condition notification system. The in-vehicle terminals 2 and the operation management terminal 3 basically function as computers, and the center unit 4 basically functions as a server. Each of the in-vehicle terminals 2 is connected to the center unit 4 via a packet communications network 5, which uses cellular phone lines, so as to allow wireless communication, and the operation management terminal 3 is connected to the center unit 4 via the Internet 6. Thereby, the center unit 4 relays transmission and reception of information between the in-vehicle terminals 2 and the operation management terminal 3. Note that the in-vehicle terminals 2, the operation management terminal 3, and the center unit 4 may be connected via the same network.

With this operating condition notification system, each of the in-vehicle terminals 2 acquires operation data regarding the operating conditions of the vehicles 1, and transmits the acquired operation data to the operation management terminal 3 via the center unit 4. Notification condition information specifying one of the pieces of the acquired operation data to be transmitted is set to each of the in-vehicle terminals 2, and the in-vehicle terminals 2 then transmit the operation data satisfying the notification conditions specified by the notification condition information. Setting and changing (updating) of the notification condition information for the in-vehicle terminals 2 is carried out by the operation manager inputting the notification conditions to the operation management terminal 3 and then transmitting the notification condition information to the in-vehicle terminals 2 via the center unit 4.

Route information indicating operation patterns in addition to the notification condition information is preset to each of the in-vehicle terminals 2. Route information is information including the locations of respective starting points, respective stop-over points, and destination points (hereafter referred to as registered points) of respective delivery routes along which the respective vehicles 1 are to travel, and scheduled arrival time and scheduled departure time for the respective registered points.

The operation data acquired by each of the in-vehicle terminals 2 includes location information specifying present vehicle location, arrival information specifying arrival at each of the registered points, departure information specifying departure from each of the registered points, delay time information specifying delay times relative to the scheduled arrival times to respective registered points and scheduled departure times from respective registered points, key-on information specifying an on-state of the ignition key, loading temperature information specifying room temperature of the carrier (loading temperature), recess begin information specifying beginning of a recess, recess end information specifying end of a recess, wait begin information specifying beginning of waiting, wait end information specifying end of waiting, load/unload begin information specifying beginning of loading/unloading, load/unload end information specifying end of loading/unloading, preparation begin information specifying beginning of preparation, and preparation end information specifying end of preparation. In this case, recess begin information, recess end information, wait begin information, wait end information, load/unload begin information, load/unload end information, preparation begin information, and preparation end information are the operation data entered and transmitted by a driver or occupant of each of the vehicles 1 (hereafter referred to as delivery person) when all of the vehicles 1 are halting or moving. Furthermore, recess corresponds to halting for a recess, wait corresponds to halting for adjusting the delivery time, load/unload corresponds to halting for loading and unloading, and preparation corresponds to halting for other reasons. Note that which of these pieces of information is transmitted when a vehicle 1 is at a halt is left to the judgment of the delivery person.

Of this operation data, location information, arrival information and departure information for each of the registered points, key-on information, wait begin information, wait end information, load/unload begin information, load/unload end information, preparation begin information, and preparation end information are items of the notification conditions that are settable independently as notification conditions; wherein whether or not each of the information is to be transmitted is set to each item. Instead of directly transmitting the delay time information to the outside, delay information is generated as operation data when a delay has occurred exceeding a preset duration relative to the scheduled arrival time at each of the registered points or relative to the scheduled departure time from each of the registered points (i.e., when a delay has occurred exceeding a predetermined duration for the operation patterns), and information of whether or not this delay information is transmitted and the delay time are set as notification condition items. Furthermore, instead of directly transmitting the loading temperature information to the outside, carrier exceeding-temperature information is generated as operation data when the room temperature of the carrier (loading temperature) is higher or lower than a preset threshold, and information of whether or not this carrier exceeding-temperature information is to be transmitted and a threshold temperature is set as a notification condition item. Moreover, transmission intervals in which the location information is transmitted at every certain number of minutes are also set as a notification condition item. Note that the above-mentioned arrival information, departure information, delay information, and carrier exceeding-temperature information are generated by a notification determination unit 15 described later.

Each of the vehicles 1 is provided with a location sensor 7, a key-on/off sensor 8, and a temperature sensor 9 in addition to the in-vehicle terminal 2, as shown in FIG. 2. The location sensor 7 acquires location information of a vehicle using global positioning systems (GPS). The key-on/off sensor 8 detects whether the ignition key is on or off. The temperature sensor 9 is provided in the carrier and detects the room temperature (loading temperature) thereof. Note that in this embodiment, although it is not particularly shown in the drawing, the carrier is divided into three chambers, and a temperature sensor 9 is provided in each of the chambers. The location information acquired by the location sensor 7, the key-on/off information detected by the key-on/off sensor 8, and the loading temperature information detected by the temperature sensor 9 are output to the in-vehicle terminal 2.

The in-vehicle terminal 2 includes a central processing unit (CPU) 10, memory (notification condition storage unit) 11, a transmitter-receiver (in-vehicle terminal transmitter-receiver) 12, and an operating switch 13. The memory 11 is stored with the above-mentioned notification condition information and route information. The transmitter-receiver 12 transmits and receives information to and from the outside via the packet communications network 5. The operating switch 13 receives various inputs from the delivery person, and then outputs information corresponding to those inputs to the CPU 10.

The CPU 10 includes an operation data acquisition unit 14, a notification determination unit 15, and a notification condition updating unit 16. The operation data acquisition unit 14 acquires the above-mentioned operation data of the vehicle 1. The notification determination unit 15 reads out the above-mentioned notification condition information from the memory 11, and determines whether the operation data acquired by the operation data acquisition unit 14 satisfies the notification conditions (each of the notification condition items) specified by the read out notification condition information. The notification condition information read out from the memory 11 for the notification determination unit 15 to make the above-described determination is the updated notification condition information stored last in the memory 11. The transmitter-receiver 12 transmits operation data, which is determined to satisfy the notification conditions by the notification determination unit 15, to the center unit 4. The notification condition updating unit 16 stores the notification condition information, which is transmitted from the center unit 4 and received by the transmitter-receiver 12, in the memory 11.

As shown in FIG. 3, the operation data acquisition unit 14 has a location detector 17, a route setting unit 18, a delay time measuring unit 19, an input receptor 20, a key-on/off detector 21, and a loading temperature detector 22.

The location detector 17 receives input location information from the location sensor 7, and then outputs the location information to the notification determination unit 15, the route setting unit 18, and the delay time measuring unit 19. The input receptor 20 receives from the operating switch 13 information corresponding to various inputs from the delivery person, and then outputs the information to the notification determination unit 15 and the route setting unit 18. The key-on/off detector 21 receives key-on information form the key-on/off sensor 8, and then outputs this key-on information to the notification determination unit 15. The loading temperature detector 22 receives loading temperature information from the temperature sensor 9, and then outputs this loading temperature information to the notification determination unit 15.

The route setting unit 18 has a function of setting route information according to an input to the operating switch 13 and then storing it in the memory 11, and also has a function of reading out the route information stored in the memory 11 according to an input to the operating switch 13 and then outputting it to the notification determination unit 15 and the delay time measuring unit 19.

The route information is set using the route setting unit 18 by the delivery person setting the operating switch 13 in a predetermined manner while he/she is actually driving the vehicle 1 along a delivery route. This setting begins by the delivery person first setting the operating switch 13 in a predetermined manner at the time the vehicle 1 departs the departure point of the delivery route. After the setting has begun, the operating switch 13 is successively set in a predetermined manner at arrival times at stop-over points and also at departure times of departing therefrom, respectively. The operating switch 13 is set in a predetermined manner at the time of arrival to the final destination point, thereby concluding the processing for setting. At the time of the respective inputs, the route setting unit 18 stores successively the location information and associated times in the memory 11. As a result, the route information (operation pattern) including the locations of respective registered points along the delivery route that the vehicle 1 travels and the scheduled arrival time and the scheduled departure time for each of the registered points is set attached with a predetermined operation pattern code and then stored in the memory 11. Multiple pieces of information discriminated by different operation pattern codes may be stored in the memory 11. Furthermore, in the case of setting new route information, the route setting unit 18 requests the transmitter-receiver 12 to transmit this route information to be stored in memory 30 of the center unit 4, which is described later.

The delay time measuring unit 19 calculates delay times relative to the scheduled arrival times at respective registered points or at the scheduled departure times of departing therefrom based on the location information from the location detector 17 and the route information from the route setting unit 18, and then outputs delay time information indicating these delay times.

The notification determination unit 15 determines whether or not to transmit the respective pieces of operation data to the center unit 4 based on the notification conditions (respective notification condition items) read out from the memory 11.

Of the location information input sequentially to the notification determination unit 15 from the location detector 17, only location information input at every predetermined time period is output to the center unit 4 from the transmitter-receiver 12 when the location information is set as a notification condition to be transmitted at every predetermined time period, for example. When it is set so that arrival information for a registered point is to be transmitted as a notification condition, the notification determination unit 15 determines whether or not the vehicle 1 has reached the registered point based on the location information input from the location detector 17 and the route information input from the route setting unit 18 and generates arrival information when arrival is determined. Afterwards, the generated arrival information is output from the transmitter-receiver 12 to the center unit 4. Similarly, when it is set so that departure information for a registered point is transmitted as a notification condition, the notification determination unit 15 determines whether or not the vehicle 1 has departed from the registered point based on the location information input from the location detector 17 and the route information input from the route setting unit 18, and generates departure information when departure is determined. Afterwards, the generated departure information is output from the transmitter-receiver 12 to the center unit 4. When it is set so that delay information is to be transmitted as a notification condition in the case of a delay of the operation pattern greater than a predetermined duration, the notification determination unit 15 determines whether or not the vehicle 1 is delayed greater than a predetermined duration based on the delay time information input from the delay time measuring unit 19, and generates delay information when delay is determined. Afterwards, the generated delay information is output from the transmitter-receiver 12 to the center unit 4. When key-on information is set as a notification condition, the key-on information input from the key-on/off detector 21 is output from the transmitter-receiver 12 to the center unit 4. When recess begin information, recess end information, wait begin information, wait end information, load/unload begin information, load/unload end information, preparation begin information, and preparation end information are relevant are set as notification conditions, the respective pieces of information received from the input receiver 20 are output from the transmitter-receiver 12 to the center unit 4. When a notification condition requiring transmission of carrier exceeding temperature information is set and the loading temperature is greater (or less) than the preset threshold, the notification determination unit 15 determines whether or not the loading temperature is greater (or less) than the preset threshold based on the loading temperature information input from the loading temperature detector 22, and generates carrier exceeding temperature information if yes. Afterwards, the carrier exceeding temperature information is output from the transmitter-receiver 12 to the center unit 4.

As shown in FIG. 4, the operation management terminal 3 has a CPU 23, a transmitter-receiver (user terminal transmitter-receiver) 24, an input unit (user terminal input unit) 25, a display unit (user terminal annunciation unit) 26, and memory 33. The CPU 23 includes an information generation unit 27. The transmitter-receiver 24 transmits and receives information to and from the outside via the Internet 6. The CPU 23 stores the operation data, which is transmitted from the in-vehicle terminal 2 via the center unit 4 and received by the transmitter-receiver 24, in the memory 33. The display unit 26 has a display screen and displays the operation data received by the transmitter-receiver 24 on the display screen to annunciate it to the user. Furthermore, the display unit 26 displays on the display screen notification condition information corresponding to the notification condition item information, which is transmitted from the center unit 4 and received by the transmitter-receiver 24, to annunciate it to the user. Note that instead of or in addition to the display unit 26, an audio output unit for annunciating the operation data and/or notification condition items by voice may be provided.

The input unit 25 has a keyboard via which it receives from the operation manager an instruction to begin setting notification conditions and notification condition settings. This instruction to begin setting is an input for specifying a vehicle and an operation pattern as described later, and the received notification conditions are for setting the above-given respective notification condition items. The information generation unit 27 generates setting begin information according to the instruction to begin setting received by the input unit 25 and notification condition information according to the input notification conditions. The transmitter-receiver 24 transmits the setting begin information and the notification condition information generated by the information generation unit 27 to the center unit 4 via the Internet 6.

As shown in FIG. 5, the center unit 4 has a CPU 28, a transmitter-receiver (relay transmitter-receiver) 29, and memory (relay management memory) 30. The transmitter-receiver 29 transmits and receives information to/from the in-vehicle terminals 2 via the packet communications network 5, and transmits and receives information to/from the operation management terminal 3 via the Internet 6. The notification condition item information corresponding to the above-given notification condition items and the above-mentioned route information are stored in the memory 30 for every vehicle 1.

The notification condition item information of this embodiment is included in the above-mentioned notification condition information, and the notification condition information is stored in the memory 30. Furthermore, an address is stored as transmission destination specifying information, which specifies operation management terminal 3, in the memory 30. Moreover, the memory 30 is configured to store other addresses specifying other terminals such as the in-vehicle terminals 2 or terminals 31 and 32 capable of receiving information via the packet communications network 5 or the Internet 6, and settings of whether or not to transmit operation data at these other addresses. Note that these terminals 31 and 32 include terminals of all kinds of aspects such as personal computers and mobile phones.

When the transmitter-receiver 29 receives the operation data from the in-vehicle terminal 2, the CPU 28 stores the operation data in the memory 30 and transmits it to the operation management terminal 3 from the transmitter-receiver 29. Furthermore, in the case where the other addresses set so as to obtain transmission are stored in the memory 30, the CPU 28 transmits this operation data to the terminals specified by the other addresses from the transmitter-receiver 29.

When the transmitter-receiver 29 receives the setting begin information from the operation management terminal 3, the CPU 28 reads out the updated information of the notification condition item information (notification condition information) of interest from the notification condition item information (notification condition information) stored in the memory 30 and transmits it to the operation management terminal 3 from the transmitter-receiver 29. Furthermore, when the transmitter-receiver 29 receives the notification condition information from the operation management terminal 3, the CPU 28 stores the notification condition information in the memory 30 and transmits it to the in-vehicle terminal 2 from the transmitter-receiver 29.

Next, processing for notification of operation data by the operating condition notification system is described based on FIG. 6.

The processing for notification of operation data begins by the delivery person of the vehicle 1 setting the operating switch 13 of the in-vehicle terminal 2 in a predetermined manner. At this time, the delivery person sets the operating switch 13 for specifying from the route information stored in the memory 11, route information corresponding to an operation route for a delivery to be made. The route setting unit 18 reads out the specified route information from the memory 11 in conformity with the input and then outputs it to the notification determination unit 15 and the delay time measuring unit 19.

Once the processing for notification begins, the operation data acquisition unit 14 of the in-vehicle terminal 2 acquires operation data sequentially and outputs it to the notification determination unit 15 (step S1). The notification determination unit 15 reads out the updated notification condition information from the memory 11 (step S2), and determines whether the operation data input from the operation data acquisition unit 14 satisfies the notification conditions specified by the read out notification condition information (step S3). The transmitter-receiver 12 transmits to the center unit 4 the operation data when it is determined that the notification conditions are satisfied (step S4). On the other hand, when it is determined that the notification conditions are not satisfied, processing returns to step S1.

In the center unit 4, when the transmitter-receiver 29 receives the operation data from the in-vehicle terminal 2 (step S5), the CPU 28 stores the operation data in the memory 30 (step S6) and transmits it to the operation management terminal 3 from the transmitter-receiver 29 (step S7). Note that when there is another address set so as to obtain transmission, the operation data is also transmitted to a terminal specified by that other address.

In the operation management terminal 3, when the transmitter-receiver 24 receives the operation data from the center unit 4 (step S8), the CPU 23 stores the operation data in the memory 33 and displays it on the display unit 26 to annunciate it to the user (step S9).

Accordingly, the operation manager may reliably monitor the operating condition of the vehicle 1 delivering a package using the operation data displayed on the display unit 26.

Next, processing for updating notification conditions by the operating condition notification system is described based on FIG. 7.

The processing for updating notification conditions begins by the operation manager manipulating the input unit 2 to input an ID number and a password while looking at an input screen displayed on the display unit 26 and provided to the operation management terminal 3 from the center unit 4 via the Internet 6 (step S11). The ID number is a number for identifying the operation manager, and the password is a number associated to the ID number. The ID number and the password are numbers issued by the system management company and supplied to the operation manager, and are stored in the memory 30 of the center unit 4. Note that the ID number may be a number for identifying the operation management terminal 3.

Next, the input ID number and password are transmitted to the center unit 4 from the operation management terminal 3 in conformity with an instruction input from the operation manager (step S12).

When the center unit 4 receives the ID number and the password from the operation management terminal 3 (step S13), the CPU 28 verifies that they match the ID number and the password stored in the memory 30. When the operation manager is specified as a result of the verification, the center unit 4 transmits an initial screen to the operation management terminal 3 (step S14). This initial screen includes vehicle names of all of the vehicles 1 managed by the specified operation manager, and operation patterns (route information) set to the respective vehicles 1. Note that unique vehicle information of the respective vehicles including vehicle names of the vehicles 1 managed by the operation manager is prestored in the memory 30 of the center unit 4.

When the operation manager terminal 3 receives the initial screen transmitted from the center unit 4, the display unit 26 then displays it (step S15).

Next, the operation manager manipulates the input unit 25 while looking at the initial screen to identify vehicle 1 and operation pattern (step S16). When the vehicle 1 and operation pattern are identified, information thereof is transmitted to the center unit 4 in conformity with an instruction input from the operation manager (step S17).

When the center unit 4 receives information of that vehicle 1 and the operation pattern from the operation management terminal 3 (step S18), the CPU 28 reads out registration information, which includes the vehicle information corresponding to the vehicle 1 and the operation pattern specified by the operation management terminal 3, an operation pattern code, the notification condition information (notification condition item information), and addresses of other operating terminals, and then transmits it to the operation management terminal 3 (step S19). Note that when the registration information is updated, the CPU 28 reads out and transmits the updated registration information.

When the operation manager terminal 3 receives the registration information transmitted from the center unit 4, the display unit 26 then displays it (step S20).

FIG. 8 shows exemplary registration information displayed on the display unit 26. In this example, 'individual information', 'arrival at/departure from registered point', 'operating state', 'loading temperature', 'vehicle location', and 'with/without mail transmission' are displayed.

The section for 'individual information' displays vehicle name, vehicle identification number, operation pattern code, operation pattern, license number, and latest update time and date.

Each of the items set in the respective sections of 'arrival at/departure from registered point', 'operating state', 'loading temperature', and 'vehicle location' is provided with a box for putting a checkmark for the case of transmitting them, and boxes for setting threshold numbers for delay time (delayed time) and loading temperature, respectively.

For example, in the 'arrival at/departure from registered point' section, a box for putting a checkmark, which is used for annunciating the fact or operation data that the vehicle has arrived at each of the registered points (box corresponding to 'arrival'), a box for putting a checkmark, which is used for annunciating the fact or operation data that the vehicle has departed from each of the registered points (box corresponding to 'departure), boxes corresponding to respective registered point names (three point names LM1, LM2, LM3) in the above-mentioned specified operation pattern, and a box for setting a threshold for delayed time are provided.

In the case of wanting to know whether the vehicle 1 has arrived at a registered point, the operation manager puts a checkmark in the box corresponding to 'arrival' and puts a checkmark in the box corresponding to that registered point name. According to these settings, when the vehicle arrives at the selected registered point, arrival information indicating this arrival is transmitted to the in-vehicle terminal 2 from the center unit 4.

Similarly, in the case of wanting to know whether the vehicle has departed from a registered point, the operation manager puts a checkmark in the box corresponding to 'departure' and puts a checkmark in the box corresponding to that registered point name. According to these settings, when the vehicle departs from the selected registered point, departure information indicating this departure is transmitted to the in-vehicle terminal 2 from the center unit 4.

Furthermore, in the case of wanting to know whether the actual operation of the vehicle 1 is delayed more than a predetermined time relative to the specified operation pattern, the operation manager sets that predetermined time in the box corresponding to 'delayed time'. According to these settings, delay information is transmitted to the in-vehicle terminal 2 from the center unit 4 when the vehicle 1 is delayed more than the predetermined time relative to the operation pattern.

In the 'operating state' section, boxes corresponding to 'key-on', 'recess begin', 'recess end', 'wait begin', 'wait end', 'load/unload begin', 'load/unload end', 'preparation begin', and 'preparation end' are provided. By putting checkmarks in the respective boxes, recess begin information indicating beginning of a recess, recess end information indicating end of a recess, wait begin information indicating beginning of waiting, wait end information indicating end of waiting, load/unload begin information indicating beginning of loading/unloading, load/unload end information indicating end of loading/unloading, preparation begin information indicating beginning of preparation, and preparation end information indicating end of preparation are respectively transmitted to the center unit 4 from the in-vehicle terminal 2.

In the 'loading temperature' section, a box for selection of 'sensor 1', 'sensor 2', and 'sensor 3' and boxes in which thresholds are set are provided for the respective sensors. By putting a checkmark in each of the boxes and setting thresholds (temperatures), carrier exceeding temperature information is transmitted to the center unit 4 from the in-vehicle terminal 2 when the loading temperatures are higher or lower than the thresholds. Note that the 'sensor 1', 'sensor 2', and 'sensor 3' respectively correspond to the temperature sensors 9 provided in each of the three chambers of the carrier.

In the 'vehicle location' section, a box for selection of 'transmit vehicle location' and a box for setting 'transmission interval' are provided. By putting a checkmark in the box and setting the transmission interval (time), location information is transmitted to the center unit 4 from the in-vehicle terminal 2 at every predetermined time.

In the 'with/without mail transmission' section, a box for putting a checkmark when operation data is to be transmitted to other operating terminals, and boxes for setting addresses (e.g., email addresses) of those other operating terminals are provided.

The operation manager puts a checkmark or a number in the respective boxes while referring to the pertinent registration information, thereby changing the notification condition information (notification condition item information) and/or addresses (step S21).

When the update of the above-given setting is carried out and the input unit 25 receives an instruction to finalize the update from the operation manager, the information generation unit 27 generates registration information (including notification condition information) and then transmits this registration information to the center unit 4 (step S22).

When the center unit 4 receives the registration information from the operation management terminal 3 (step S23), the CPU 28 stores the registration information in the memory 30 (step S24) and transmits it to the in-vehicle terminal 2 (step S25).

When the in-vehicle terminal 2 receives the registration information from the center unit 3 (step S26), the updated notification condition information included in this received registration information is stored in the memory 11 by the notification condition updating unit 16 (step S27), thereby completing this processing.

Note that as a continuation after the processing of step S27, update processing completion information indicating completion of the update processing may be transmitted to the operation management terminal 3 from the in-vehicle terminal 2 via the center unit 4. This allows the operation manager at the operation management terminal 3 to easily and assuredly acknowledge that the update processing has normally completed.

In this manner, the operation manager may update notification conditions to be set to the in-vehicle terminal 2 by entering settings to the operation management terminal 3. Afterwards, the notification determination unit 15 of the in-vehicle terminal 2 reads out the updated notification condition information stored last in the memory 11, and determines whether or not the operation data acquired by the operation data acquisition unit 14 satisfies the notification conditions specified by the updated notification condition information. Therefore, after the notification conditions are updated, transmission of the operation data from the in-vehicle terminal 2 to the operation management terminal 3 is carried out in conformity with the updated notification conditions.

Accordingly, the operation manager may change the notification conditions set to the in-vehicle terminal 2 of the vehicle by operating the operation management terminal 3 provided to the delivery company. Namely, the operation manager may change the notification conditions in real time without being limited in time or location of the vehicle 1 having the in-vehicle terminal 2 even when the vehicle 1 is, for example, in a remote location or while it is moving, as long as the in-vehicle terminal 2 is in a state allowing reception of information from the center unit 4.

Furthermore, when changing the notification conditions, the operation manager only needs to enter settings in conformity with notification condition items provided from the center unit 4, and thus may easily change the notification conditions.

While the in-vehicle terminal 2 can acquire location information of the vehicle as operation data, it is not always necessary for the operation manager to know successive locations of the vehicle in normal delivery work. However, the operation manager must immediately know the location of the vehicle 1 in special circumstances such as when the vehicle 1 is not carrying out a scheduled operation or in the case of a robbery. In this regard, with this embodiment, even when successive transmission of location information is not included in normal notification conditions, the operation manager may immediately know the location information of the vehicle 1 by changing settings of the notification conditions from the operation management terminal 3, and thereby instantly accommodating special circumstances such as when the vehicle 1 is not carrying out a scheduled operation or in the case of a robbery.

Furthermore, since changing settings of the notification conditions may be carried out using the operation management terminal 3 according to need by limiting the normal notification conditions to the minimum operation data, amount of operation data to be transmitted from the in-vehicle terminal 2 may be kept to a minimum, and on the whole, limited network resources can be used effectively.

Moreover, the center unit 4 is connected to multiple in-vehicle terminals 2 equipped in respective vehicles 1 via the packet communications network 5, and notification condition item information is prestored in the memory 30 of the center unit 4 for every vehicle 1. At the time of updating the notification conditions, the center unit 4 provides the notification condition item information corresponding to each of the vehicles 1 to the operation management terminal 3, and thus the operation manager may change different notification conditions for every vehicle 1 through simple operations.

Moreover, it may be set so that operation data is also transmitted from the center unit 4 to other terminals aside from the operation management terminal 3. Such setting allows even someone (e.g., delivery person) other than the operator to acquire operation data using the above-mentioned other terminals as with the operator.

INDUSTRIAL APPLICABILITY

The present invention may be applied to various operating condition notification systems in which an in-vehicle terminal equipped in a vehicle is connected to a user terminal provided on the user side via a predetermined network.

The invention claimed is:

1. An operating condition notification system in which an in-vehicle terminal equipped in a vehicle is connected to a user terminal provided on the user side via a predetermined network, wherein
the in-vehicle terminal comprises an in-vehicle terminal transmitter-receiver, which transmits and receives information to and from the outside via the network, an operation data acquisition unit, which acquires operation data regarding operating conditions of the vehicle, a notification condition storage unit, which is stored with notification condition information specifying one of pieces of the operation data to be transmitted to the outside, and a notification determination unit, which reads out the notification condition information from the notification condition storage unit and determines whether the operation data acquired by the operation data acquisition unit satisfies the notification conditions specified by the read out notification condition information;
the in-vehicle terminal transmitter-receiver transmits operation data determined to satisfy the notification conditions by the notification determination unit to the user terminal;
the user terminal comprises a user terminal transmitter-receiver, which transmits and receives information to and from the outside via the network, and a user terminal annunciation unit, which annunciates to the user, operation data received from the in-vehicle terminal transmitter-receiver by the user terminal transmitter-receiver;
the user terminal comprises a user terminal input unit, which receives settings for the notification conditions from the user, and an information generation unit, which generates notification condition information according to the settings for the notification conditions received by the user terminal input unit;
the user terminal transmitter-receiver transmits the notification condition information generated by the information generation unit to the in-vehicle terminal;
the in-vehicle terminal comprises a notification condition updating, which stores the notification condition information, which is transmitted from the user terminal transmitter-receiver and received by the in-vehicle terminal transmitter-receiver, in the notification condition storage unit; and
the notification condition information to be read out from the notification condition storage unit by the notification determination unit to make the above-described determination is updated notification condition information stored last in the notification condition storage unit.

2. The operating condition notification system of claim 1, further comprising:
a relay management unit, which is connected to the user terminal and the in-vehicle terminal via the network, and relays information between the user terminal and the in-vehicle terminal, wherein
the relay management unit comprises a relay transmitter-receiver, which transmits and receives information between the user terminal and the in-vehicle terminal via the network, and relay management memory, which is prestored with notification condition item information corresponding to notification condition items that can be set as the notification conditions;
the user terminal input unit receives from the user an instruction to begin to set the notification conditions by the user;
the information generation unit generates setting begin information when the user terminal input unit receives an instruction to begin setting;
the user terminal transmitter-receiver transmits the setting begin information generated by the information generation unit to the relay management unit;
the relay transmitter-receiver transmits the notification condition item information stored in the relay management memory to the user terminal upon reception of the setting begin information from the user terminal transmitter-receiver;
the user terminal annunciation unit annunciates to the user, notification condition items corresponding to the notification condition item information received from the relay transmitter-receiver by the user terminal transmitter-receiver;
the user terminal input unit receives the notification condition items entered by the user, and the information generation unit generates notification condition information according to the notification condition items received by the user terminal input unit;

the user terminal transmitter-receiver transmits the notification condition information generated by the information generation unit to the relay management unit; and the relay transmitter-receiver receives the notification condition information from the user terminal transmitter-receiver and transmits the notification condition information to the in-vehicle terminal.

3. The operating condition notification system of claim 2, wherein the relay management memory is stored with multiple pieces of transmission destination specifying information including at least transmission destination specifying information, which specifies the user terminal, and transmission destination specifying information, which specifies a terminal other than the user terminal capable of receiving information via the network; and the relay transmitter-receiver transmits operation data transmitted from the in-vehicle terminal transmitter-receiver to multiple terminals specified by the transmission destination specifying information stored in the relay management memory upon reception of the operation data.

* * * * *